(12) United States Patent
Tytgat (10) Patent No.: US 10,692,269 B2
(45) Date of Patent: Jun. 23, 2020

(54) METHOD AND DEVICE FOR IMAGE PROCESSING

(71) Applicant: Alcatel Lucent, Nozay (FR)

(72) Inventor: Donny Tytgat, Antwerp (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/329,050

(22) PCT Filed: Sep. 4, 2017

(86) PCT No.: PCT/EP2017/072076
§ 371 (c)(1),
(2) Date: Feb. 27, 2019

(87) PCT Pub. No.: WO2018/046432
PCT Pub. Date: Mar. 15, 2018

(65) Prior Publication Data
US 2019/0221026 A1 Jul. 18, 2019

(30) Foreign Application Priority Data

Sep. 6, 2016 (EP) .................................. 16306116

(51) Int. Cl.
| | | |
|---|---|---|
| *G06T 15/04* | (2011.01) | |
| *G06T 5/50* | (2006.01) | |
| *G06T 5/00* | (2006.01) | |

(52) U.S. Cl.
CPC .............. *G06T 15/04* (2013.01); *G06T 5/005* (2013.01); *G06T 5/50* (2013.01)

(58) Field of Classification Search
None
See application file for complete search history.

(56) References Cited

U.S. PATENT DOCUMENTS

2016/0379041 A1* 12/2016 Rhee ................... G06K 9/00208
382/118
2017/0039735 A1* 2/2017 Can ....................... G06T 11/005

OTHER PUBLICATIONS

Lin Xu et al., A General Texture Mapping Framework for Image-Based 3D Modeling,: 2010 17th IEEE International Conference on Image Processing, IEEE, pp. 2713-2716, XP031814370, 2010.
Hoang Minh Nguyen et al., "High-Definition Texture Reconstruction for 3D Image-Based Modeling," International Conference on Computer Graphics, Visualization and Computer Vision, pp. 39-48, XP055356503, 2013.

(Continued)

*Primary Examiner* — Michelle Chin
(74) *Attorney, Agent, or Firm* — Fay Sharpe LLP (57) ABSTRACT

A method for generating a set of respective transformation maps for a set of respective 2D images from a same object and using a parameter-based transformation model, comprises the steps of —receiving said set of respective 2D images and said parameter-based transformation model —detecting matching regions across several pairs of the 2D images, based on the set of 2D images and 3D information of said object, —identifying respective interdependencies of the matching regions over the 2D images, —optimizing the parameters of the parameter-based transformation model over the matching regions of all images as well as over the non-matching regions in all images.

13 Claims, 9 Drawing Sheets

(56) References Cited

OTHER PUBLICATIONS

Kenji Yamamoto et al., "Color Correction for Multi-View Video Using Energy Minimization of View Networks," International Journal of Automation and Computing, vol. 5, No. 3, pp. 234-245, XP055055313, 2008.

Wei Xu et al, "Performance Evaluation of Color Correction Approaches for Automatic Multi-View Image and Video Stitching," 2010 IEEE Conference on Computer Vision and Pattern Recognition, IEEE, pp. 263-270, XP031726027, 2010.

International Search Report for PCT/EP2017/072076 dated Oct. 6, 2017.

* cited by examiner

3. Generate overlay map for camera 1

2. Overlay renders

1. Render individual textures

*Create overlap map for camera 1 via projective texturing*

METHOD AND DEVICE FOR IMAGE PROCESSING

The present invention relates to a method and devices for image processing, more in particular for applying/adapting texture in/from images from multiple image sources.

In a lot of computer graphic applications, live models of a physical object are generated based on inputs from several camera's or image sources in real-time. These models need to resemble the photographed objects as close as possible, and this is e.g. obtained by applying texture from the image source to the model. Texture is to be understood as comprising information which relates to the appearance of an object thus comprising/embracing color, shininess, shading, patterns, . . . information, . . . . In general such texture information is already present in the image files, e.g. as RGB or YUV or equivalent pixel information and could as such just be copied from these image files towards another image or a model. However, in case of cameras or other image sources which are totally unrelated, thus providing source images with varying illumination conditions/viewpoints/automatic adjustments etc., the transfer of the texture information from these different image files to one model in one image generally first requires a step of normalization of the texture data provided by these different image sources. This is certainly the case if the texture information in the captured images originates from a number of cameras that reside around the physical object, but which capturing conditions cannot be accurately controlled. Yet the resulting texture information in the resulting live (3D or 2D) model should exhibit a consistent amount of brightness, contrast, saturation, etc.; even if it comes from multiple sources.

Such an initial normalization step itself is not straightforward as potentially uncontrollable camera control loops may have to be taken into account. For instance on some (web) cameras, automatic color adjustments such as the auto white balance cannot be disabled. Similarly unknown non-linear responses of the individual cameras (dependent on the scene) and viewpoint-specific artifacts in the captured images such as glare and specularity ("shininess of materials—e.g. human skin") may be present.

During the context of this patent application specularity is to be understood related to the amount of reflectivity of a surface (part). It is a term frequently used in real-time image processing and is important for taking into account mirror-like specular reflection of light from other surfaces during the application of texture information to an object. Specularity may be represented by a separate parameter, or can just be an optical result obtained from a particular combination of color values of neighboring pixels.

Known solutions for the initial normalization step of the image texture inputs may use a single reference pattern such as a color reference pattern to be photographed by all cameras. Normalization is then performed offline in a color-calibration process. Each camera is adjusted in order to return the same values of the color reference board on the resulting normalized color-calibrated picture. The parameters that are tuned in this case can be the gain, saturation, white balance, etc.

A first problem with this solution is that it assumes that the camera state can be fully controlled. However this full control is not always possible. Quite often cameras do not expose all parameters that are used internally to process the image. Some parameters are indeed set automatically based on the content such as automatic red eye correction, and may not be initially present during the color calibration process of the camera. Such uncontrollable adjustments can thus influence images taken with color-calibrated cameras in an unpredictable way.

Moreover image alterations that are introduced by the context of the color-calibrated camera such as the sun directly shining into the camera causing glare, or relative to the subject e.g. specular or shiny materials looking differently depending on the viewing angle, cannot be handled using this technique. As notably the human skin has noticeable specularity, when capturing the same human subject with 2 cameras at different viewing angles, the resulting images won't necessarily be the same even when discarding projective transformations and even if these cameras were color-calibrated in an earlier step.

Another prior art method used for this normalization is based on histogram matching which involves first constructing color histograms for all cameras based on images by these cameras from a same scene, on the basis of which later transformations for each of the cameras are then calculated with the aim to transform these histograms into a single common one. These transformations will then be applied later to all images taken by these cameras, with the hope that on these transformed images the color/texture information will be the same. However this solution only provides good results if the later images taken by the different cameras also show similar color statistics. This is in general not the case, especially not in situations where image histograms can fluctuate depending on context conditions of the cameras.

There is thus a need for a simple solution more in particular for finding correct and appropriate transformation maps to be applied to the texture input from images taken by different cameras, which takes into account and is therefore optimized over all cameras, especially more than two cameras, in an online fashion, and which is capable of handling uncontrollable camera parameters and all kinds of camera context such as specularity of the subject or interference with strong light sources.

This object is achieved by means of an embodiment of a method for generating a set of respective transformation maps for a set of respective 2D images from a same object and using a parameter-based transformation model, said method comprising the steps of receiving said set of respective 2D images and said parameter-based transformation model detecting matching regions across several pairs of the 2D images, based on the set of 2D images and 3D information of said object, identifying respective interdependencies of the matching regions over the 2D images, optimizing the parameters of the parameter-based transformation model over the matching regions of all images as well as over the non-matching regions in all images.

In this way not only intra-image (different areas in one image) but also inter-image (areas related to same part of object between several images) is taken care of, thereby obtaining a general solution.

In an embodiment the method further comprises a step of calibrating the set of respective 2D images and the 3D information of said object.

This may be needed in case the 3D information and the 2D images are not registered.

In another variant said optimizing step comprises solving an optimization function over said respective matching regions, and over the non-matching regions of all images.

In yet another implementation said optimizing step comprises an iterative process of updating the parameters of the model over the respective matching regions of the images followed by updating the parameters of the model in between the matching regions in the respective images.

The latter implementation may be more appropriate in case computing or processing resources are limited.

This iterative process may be ended based upon a predetermined maximum number of iterations, or, alternatively based upon a quality metric.

The present invention relates as well to embodiments of an image processing device for performing the aforementioned method, as well as to embodiments of computer programs for performing these methods.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein:

FIG. 6 shows a dependency map for the example shown in FIGS. 4-5, FIGS. 7a-b show another high level embodiment of the method/device according to the invention.

It is to be remarked that the following merely illustrates the principles of the invention. It will thus be appreciated that those skilled in the art will be able to devise various arrangements that, although not explicitly described or shown herein, embody the principles of the invention. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, or processing device, whether or not such computer or processor or processing device is explicitly shown.

Figure 1:
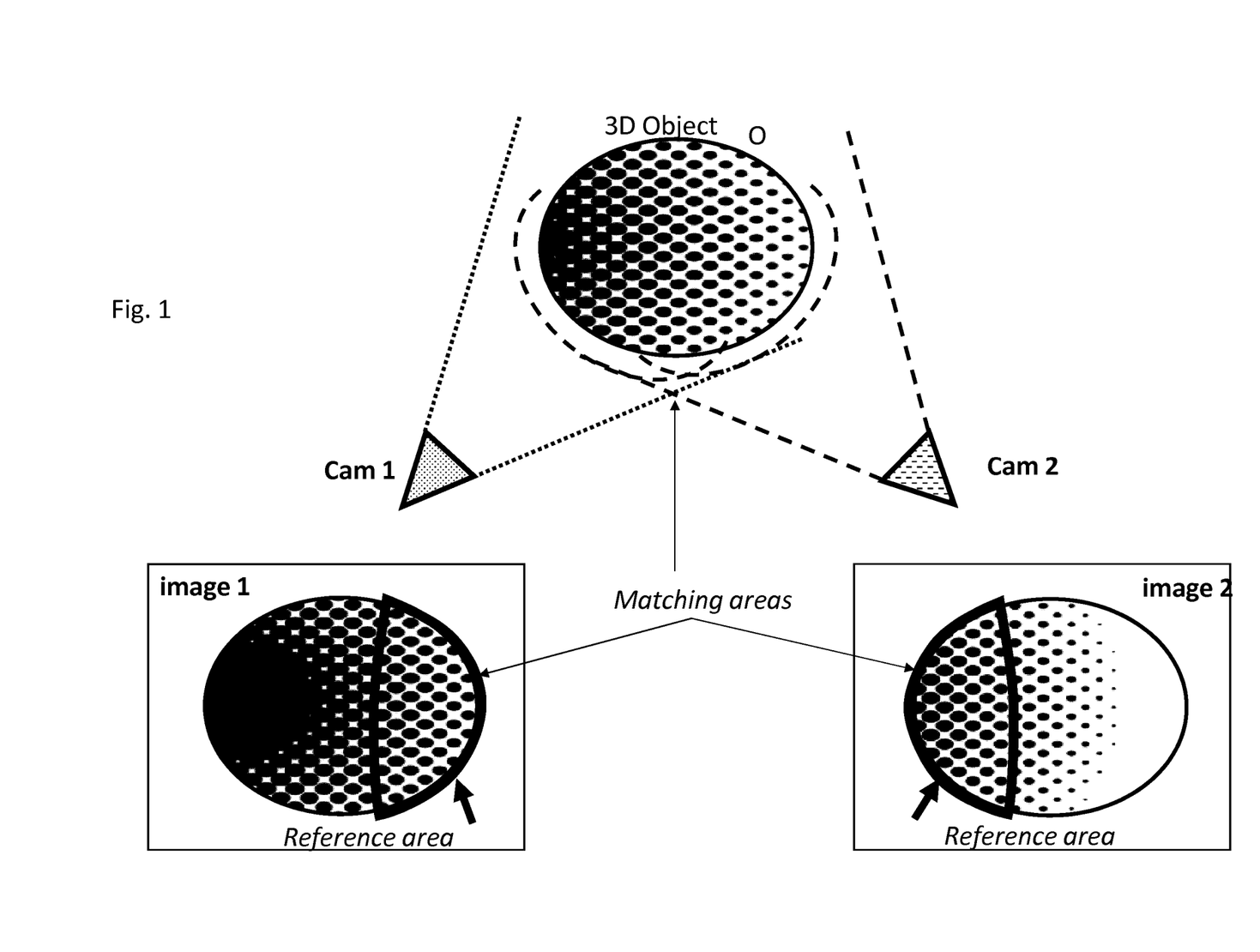
FIG. 1 schematically shows a 3D object with different texture over its surface of which an image is taken by two cameras with a different viewpoint.

FIG. 1 depicts an egg-shaped object O of which the color texture (as displayed on this figure) varies from completely black at the left to completely white at the back (not displayed) at the right edge, with varying degree of intensity of black dots in between. Two cameras, cam 1 and cam 2 are shown which capture an image of this object, but due to their different relative position with respect to this object, this object has a more black appearance on the image 1 taken by cam 1, and image 2, taken by cam 2, shows the object to look more white. On FIG. 1 only two cameras are depicted, for ease of explanation of the terminology. It is evident that embodiments of the invention are suitable for situations where a plurality of images of the same object, originating from different sources (cameras or image files) with different viewpoint are used as input for determining a color/texture transformation map for applying to these images.

In FIG. 1 the part of the object which is present in image 1 is indicated by the dashed curved line partly aligning with the left part of the object, and the part of the object present in image 2 is depicted by the dashed curved line partly aligning with the right part of the object. These different parts are due to the different 3D viewpoints of the cameras or equivalent viewpoint in case of image files.

The area where both dashed lines overlap corresponds to the part of the object which is photographed in common by both cameras. This is called a matching area. In general, within the context of this patent application matching areas within the plurality or set of images are those parts of the images pertaining to the same physical surface of the 3D object. In FIG. 1 this is indicated as the area on images 1-2, delineated by the thick lines, and this corresponds to this part of the object given by the intersection of the two curved dashed lines underneath the 3D object.

In addition to matching areas, which are related to geometry, within the context of this patent application a reference area is defined as a part of a matching area on the 2D images for which the texture is to be adapted. In general reference areas within a plurality or set of images are thus parts of matching areas with a different texture for the object as present on the different images. In FIG. 1, as the colors of the matching areas in image1 and image 2 are not the same, the reference areas correspond to the matching areas.

A reference area denotes an area that, for a certain image/texture, can be used as a starting point for normalizing this texture information. Note that an image can, and frequently will, have more than 1 reference area, especially in case more than two cameras are involved, as in such situations several respective matching areas between several images are possible.

Matching areas denote the concept of 2 or more areas that are representations of the same 3D surface area on the common 3D object. Matching areas will be the starting point to determine the transformation parameters for the reference areas, as reference areas are part of matching areas. Using the reference areas, a transformation map is constructed per image. Using this transformation map, one can transform the corresponding texture of the image to a texture in which the matching areas have minimal color differences.

The transformation map is linked to a transformation model with a number of model parameters. This parameter-based transformation model is provided as input to the method.

A simple transformation model could be a model for only brightness adaptation, so that, for input texture YUV values per pixel, only the Y-brightness component of this color (the luminance component) is adapted in accordance with the following simple formula:

$$T(x_i)=T(\{Y_i,U_i,V_i\})=\{\alpha_i Y_i,U_i,V_i\}$$

With $\alpha_i$ being the only parameter to be optimized for every pixel i and $x_i$ generally representing the texture values for this pixel i, being the Y U V values for this particular case.

Remark that this concerns just one simple example. It is evident that in general much more complex models are used (both in the parameter space and in input/output specification equation of the model itself) in order to deal with various (non-linear) artifacts.

In another example both contrast and color saturation values are adapted, where the contrast correction may be based on local contrast normalization (LCN) which is a known non-linear technique to normalize these contrasts. As the definition of contrast itself is not uniform, and may vary itself from camera manufacturer to manufacturer the model thus first involves a definition of this value, e.g. based on the YUV values, followed by an equation to be used for harmonizing the contrast values over the image itself.

This patent application is not dealing with such models themselves, but will use such models as inputs for identifying which parameters are the ones to be harmonized.

In another example, another parameter-based model may be used to solve the influences of varying reflection based on the viewpoint of the camera.

When building the transformation map for an image, thus the set of values of the transformation parameters per pixel for this image, visual consistency in between different reference areas in one image is to ensured too. When an image has more than 1 reference area, visually smooth transition in between these areas is to be ascertained. In an example of images with 2 reference areas, parameters may therefore first be determined separately for each of these areas using an optimization algorithm that minimizes the difference in resulting texture in the matching areas (over the different sets of images) of which these reference areas from part. These resulting parameters will generally be different for the different reference areas within one image. For the non-reference areas, the parameters are determined next, e.g. using interpolation between the parameters in the respective matching/reference areas in order to generate a visually smooth texture transform. Likely this interpolation will involve more than just a linear transform in between the different reference and non-reference areas.

However in other embodiments/implementation an optimization function will in one step take into account both matching and non-matching areas across all images. This will in general require more processing resources compared to the two-step method.

Further note that transformation parameters of the pixels in a certain reference area do not need to have the same value for all pixels of this same reference area. As mentioned before, the transformation maps for each of the textures/images should not only optimize the "local" (local to the texture) transformation, but should also take into account the transformation in a global context, meaning that the different images taken by the different cameras or originating from different sources, are linked together by means of the matching areas, and as such a transformation of texture in one image area may influence the required transformation in another image area of another image. A global optimization thus is to be done that balances the minimization of the local differences due to the applied transformation map, the smoothness of this transformation map within a texture and the minimization of the differences in the matching regions.

Figure 2A:
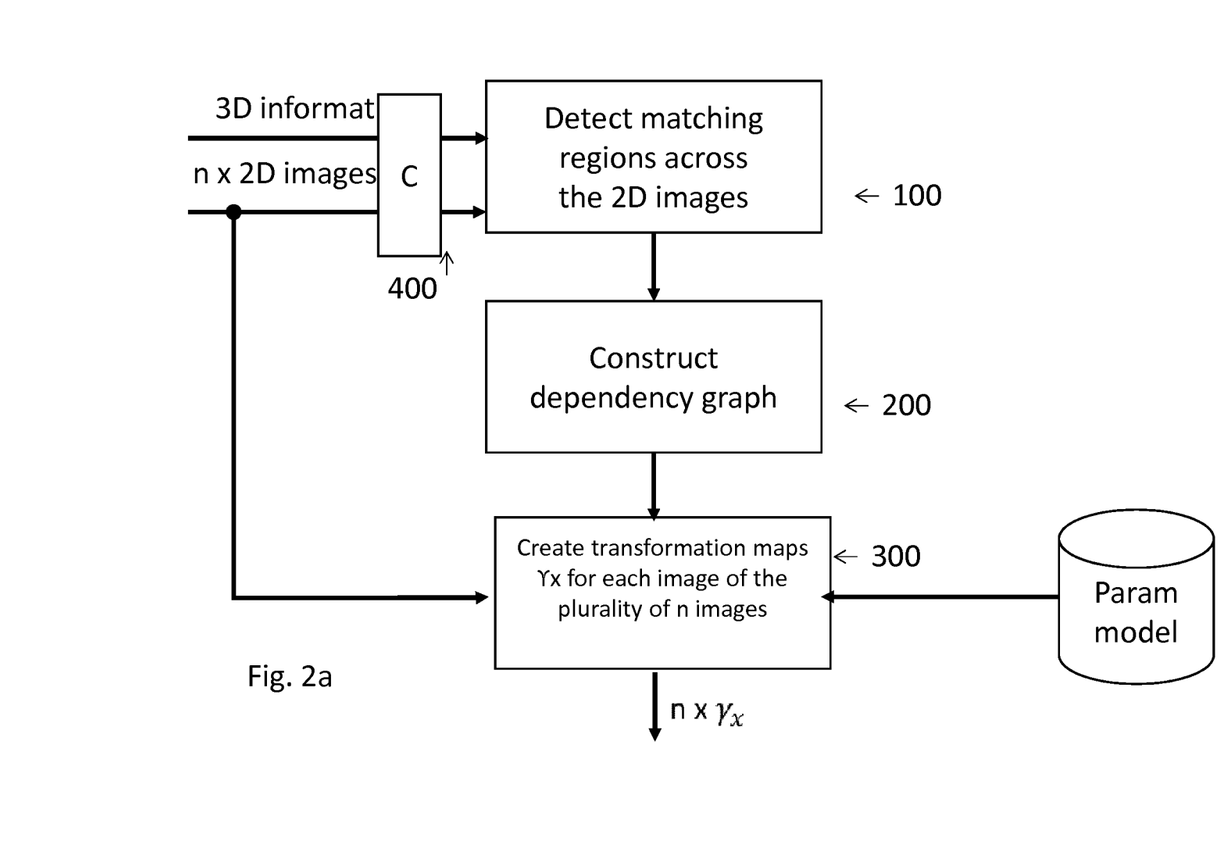
FIGS. 2a-b show a high level embodiment of the method/device according to the invention, FIG. 3 schematically explains how to create an overlay map, as being a first implementation for module 100 of FIGS. 2a-b, FIGS. 4-5 schematically explain how to create an overlap map, based on another implementation for module 100 of FIGS. 2a-b.
Figure 2B:
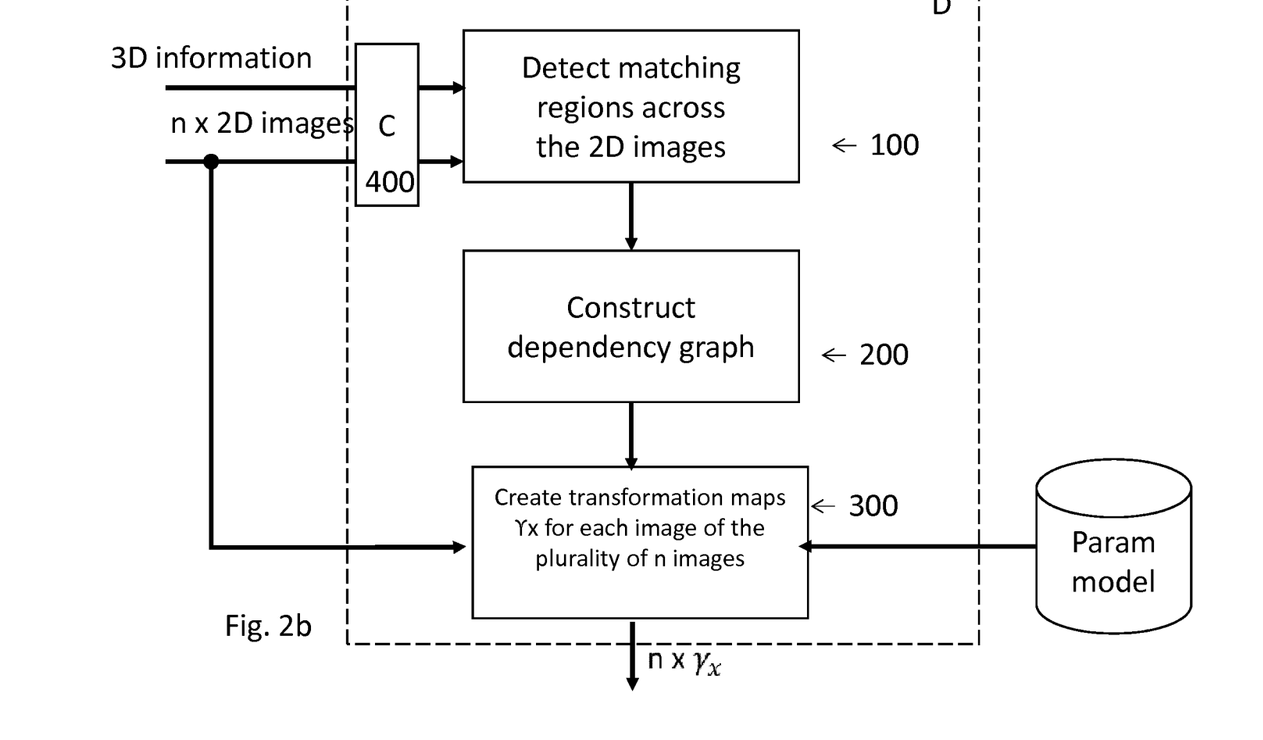

As shown in the flowchart on FIG. 2a, and which can be implemented by a device as shown in FIG. 2b, high-level embodiments of the method/device according to the invention basically comprise three main steps. A first one, depicted by module 100 relates to identifying the matching areas and reference areas within them on the set of 2D images. A second step, depicted by module 200, relates to creating the dependency graph for these areas. This dependency graph links the matching areas with the individual regions within the 2D images. This allows to determine which reference regions belong to a certain image, and which matching regions are covering these reference regions. Once the dependency graph is constructed, transformation maps can be built that determine a transformation, by means of its parameters, for every pixel of every 2D image in order to balance the image difference within matching areas and the intra-image restrictions for the transformation map. Thus not only the pixels in the reference/matching areas, but all pixels of all images.

This is performed by a third module which is adapted to generate the individual transformation maps for each of the n images. These transformation maps are denoted by $\gamma_x$ for image x. This module requires the parameter-based transformation model to be provided as input and may involve solving an optimization function for all parameters of this transformation model over all areas over all images taking into account visual consistency over the matching areas and over the images.

Each of these steps will now be discussed in a more detailed manner.

FIGS. 2a/b further show an optional $4^{th}$ module, 400, being a calibration module. This will also be explained in a further paragraph.

For the first step 100 in FIG. 2a, performed by a similarly named module in a device D of FIG. 2b, the detection of the matching regions in the 2D images involves the input of these the n 2D input images of the object, with n representing the number of images in the set, thus being a number equal or larger than 2. Another input concerns 3D information of this object of which the different images show a picture. Note that how this 3D information is represented is not important; so this 3D information of the object could comprise a triangular mesh representation of the object, or a point cloud representation, or even one or a set of depth maps, which may be obtained using a depth sensor. This 3D model information concerns the same object which is shown in the images/textures. This 3D model provides geometrical 3D information of the object.

In order to determine the matching regions it may be necessary to perform a calibration step, performed by module 400 in both FIGS. 2a-b, such as to align all image/model data to the same geometrical basis. This may involve the availability of all calibration parameters of all cameras (not shown on FIGS. 2a-b).

Once all image and 3D data a geometrically aligned, regions are identified among the n 2D images of the plurality where the same area of the object is represented, as matching areas. In order to identify the matching areas, thus being the ones that overlap on the 3D object, knowledge of this 3D's object geometry is needed and is thus provided by the 3D information. As mentioned in a previous paragraph, such detailed geometry may come from depth sensors. Alternatively, prior information might be available which can be exploited to provide an approximate geometry of the object, e.g. when it is known that all images are pictures of a human head, of which no further detailed 3D information is available, a generic 3D model of a human head can be used as 3D information or 3D model input of this object.

In order to calculate the matching areas, two implementations are described: projective texturing and naïve projections. Remark that there are other possibilities too.

Figure 3:
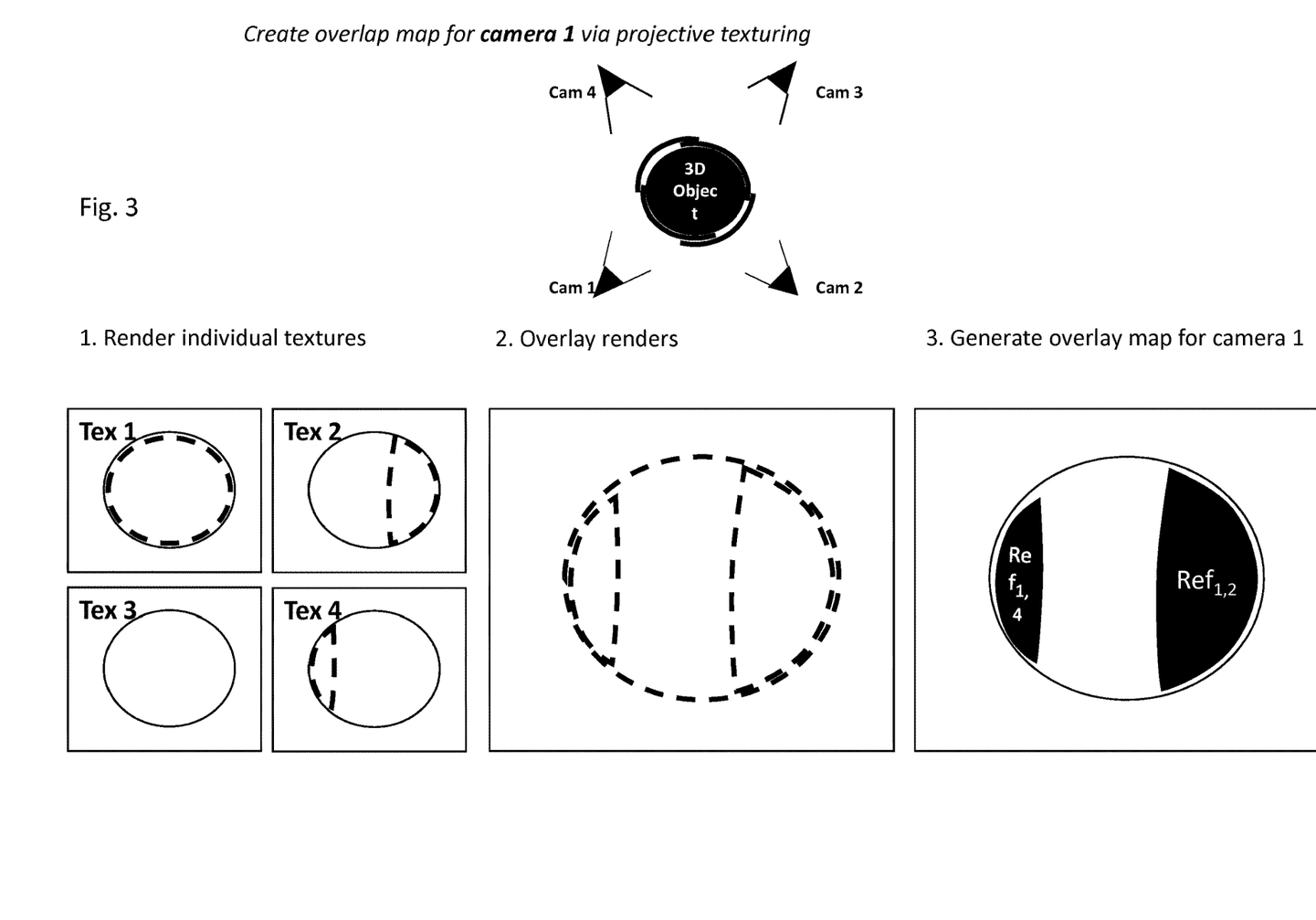

For the projective texturing, as explained on FIG. 3, per camera (e.g. cam1) a set of n full 2D respective render images (Tex1,Tex2,Tex3,Tex4) are generated, each of the respective render images (e.g. Tex2) corresponding to the point-of-view of one of the respective cameras (e.g. cam 2), but projected to the image (the full oval of Tex1) taken by the camera (cam 1) for which the full set is to be generated. This is possible based on the 3D geometry given by the 3D model and on the initial calibration step, or based on the fact that the cameras themselves and the 3D model information were already calibrated. FIG. 3 further shows how a so-called overlay map is constructed for camera 1. For this camera a total of 4 renders images, denoted Tex1 to Tex4, are generated, the first one being the one for camera 1 itself. "TEX1" indicates that the overlap area of image1 with the 2D render of the object as seen from the camera 1 itself, is indeed the image itself. But thus TEX2 shows that the overlapping area of the object as seen from cam 2 and cam 1 only concerns the right part of image 1. The picture as taken from camera 3 has nothing in common with image 1, so TEX3 is empty. And Tex4 is represented by the left area indicated by the thick dashed line on image 4 as representing the part of the object seen in common by cam 1 and cam 4. The combination of all 4 is depicted in the middle of FIG. 3, underneath the "overlay renders", showing the overlay map represents the reference areas for that image1 along with the matches for each of these reference areas. Only 1 overlay map is shown, namely that for camera 1, however as mentioned, these should be generated for each camera. The overlay map shows the reference areas for the different matching areas In the example depicted in FIG. 3, a render is made from the point-of-view of camera 1 for each of the images 1-4. That means, only 1 image is used in a certain render pass as a "projective texture". In the example shown in this figure, 4 rendering passes are done, and shown by the 4 left images, one for each image. However, in general, instead of n passes, also n−1 passes are also possible as the render for the camera viewpoint itself always corresponds to the image itself (i.e. Tex 1 will always correspond to image 1). It is to be noted that this can also be done in 1 rendering pass rather than n/n−1 separate ones. This further reduces the computational power for doing this operation, and does not impose a limiting factor for this approach.

The second step of FIG. 3 shows the overlays of the different renders and identifies the overlap regions. These regions are defined as matching areas, and the camera id's are also kept where the matching areas can be found. This is also encoded in the names; $R_{1,4}$ in this example indicates matching area between image 1 and 4, and R1,2 indicates matching area between image 1 and 2. The resulting overlay map is the output of this procedure, as is shown by the rightmost rectangle showing image 1 with inside the two reference areas: Ref1,2 and Ref1,4 indicated.

As mentioned, there's also a second option for calculating the matching areas, using naïve projections. In this method for each vertex of the 3D model, e.g. a 3D triangular mesh, and for each texture/image source image1 to image4 in the previous example, image coordinates are generated if the vertex normal is "compatible" with the camera-to-vertex vector. Compatibility is to be understood as no intersection with surfaces/objects when tracing from the vertex position towards the respective camera. Because this is a computationally intensive process, a shortcut can be made by instead just asserting if the dot product between the camera-to-vertex vector and the surface normal is larger than 0, meaning the angle between $c_x$ and n is not larger than 90 degrees, as shown on FIG. 4 and explained in the following paragraphs.

This approach starts with building a list of data per vertex of the 3D objects mesh. This data represents, for each 3D vertex, a list of the 2D image/texture coordinates, thus a list of projections for each of the cameras where the normal of the vertex (the surface normal at that point) is compatible with the camera-to-vertex vector, shown in FIG. 4 as $c_1$, $c_2$, $c_3$ and $c_4$.

Figure 4:
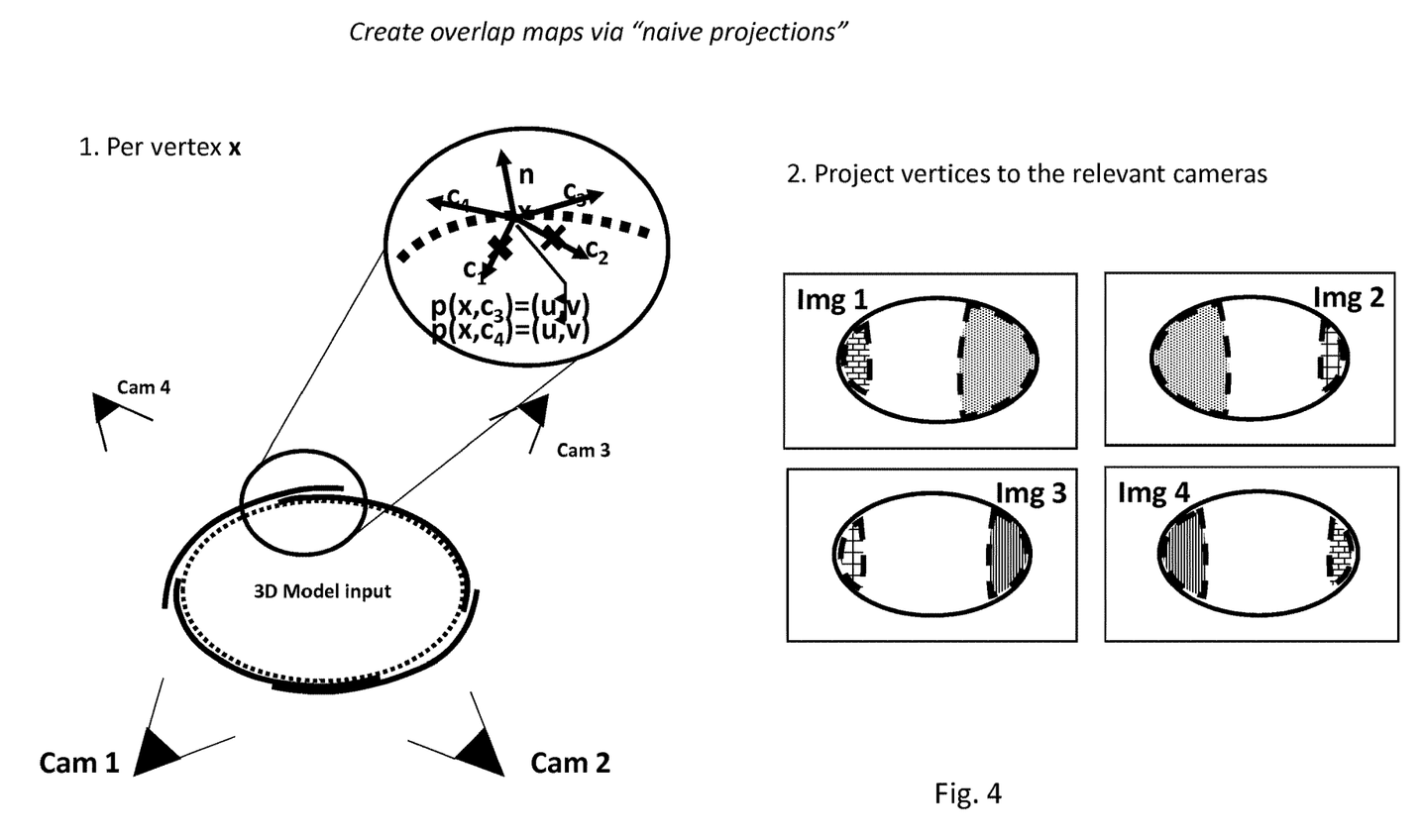

The camera-to-vertex vector $c_x$ at vertex v for the camera at location $C_x$ can be calculated as follows:

$$c_x = \text{normalize}(C_x - v)$$

with the normalize function making the given vector unit-length; as such being: normalize(x)=x/|x|.

In this example, compatibility is reached when the angle is less than 90 degrees; one can choose a smaller angle and other measures to further refine this compatibility function. This method is called "naïve" because it does not take into account occluded areas; only the normal is used to determine "visibility". While this is less accurate than the previous option, processing time can be lower.

The texture/image coordinates for the compatible cameras are then calculated. This is done for each of the compatible cameras. One can calculate these coordinates in the following manner:

$$P(x, c_3) = I_{c3} * E_{c3} * x$$

with $I_{c3}$ the intrinsic matrix for camera $c_3$ and $E_{c3}$ the extrinsic matrix for camera $c_3$.

$P(x,c_3)$ represents the (texture) coordinates of vertex x in the image of camera 3, in accordance with the pinhole camera model as is described in many tutorial handbooks.

As such, for each vertex in the mesh there is a list with texture/Image coordinates for the vertex-specific compatible cameras.

Once this is determined, an iteration over the 3D points of the 3D model is done. In an implementation an iteration over the triangles in a mesh is done, and then it is to be determined which of the vertices have valid texture coordinates, for the triangles. This determination aims identifying valid texture coordinates for the same camera, being 2D representations of these triangles to the relevant texture.

An example is shown in the following table:

| 3D vertices | image coordinates list |
| --- | --- |
| v0 | p(v0, c1), p(v0, c2) |
| v1 | p(v1, c1) |
| v2 | p(v2, c1), p(v2, c2) |

Figure 5:
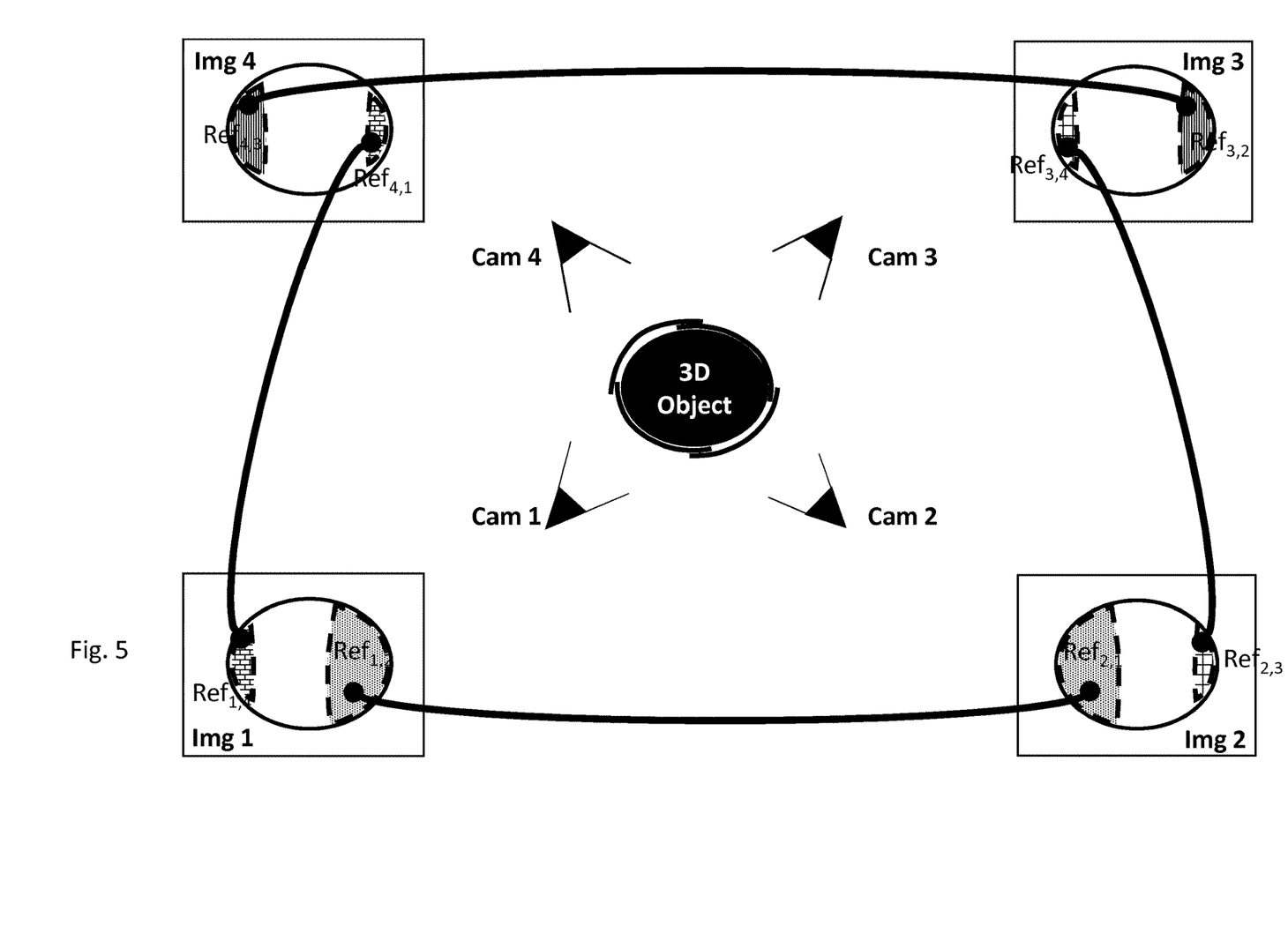

Only camera 1 has image coordinates for all 3 points (v0-v1-v2) of the triangle. As such, this triangle will only be identified onto this image (as on the 4 rightmost rectangles on FIG. 4. Note that this identification, sometimes denoted as drawing operation, is straightforward as one already has the (2D) image coordinates for each of the 3 points of the triangle. Per set of three such a notion of the source camera ($c_1$ in this example) is kept. This is done for all triangles/vertices in the mesh. This results in the 4 images with textures that are shown at the right of FIG. 4, showing the reference- and matching areas by determining the overlapping areas and checking their source camera. The corresponding camera/object setting is shown in FIG. 5.

After this, one can identify matching regions by tracing back the per-vertex image coordinates and sources.

Figure 6:
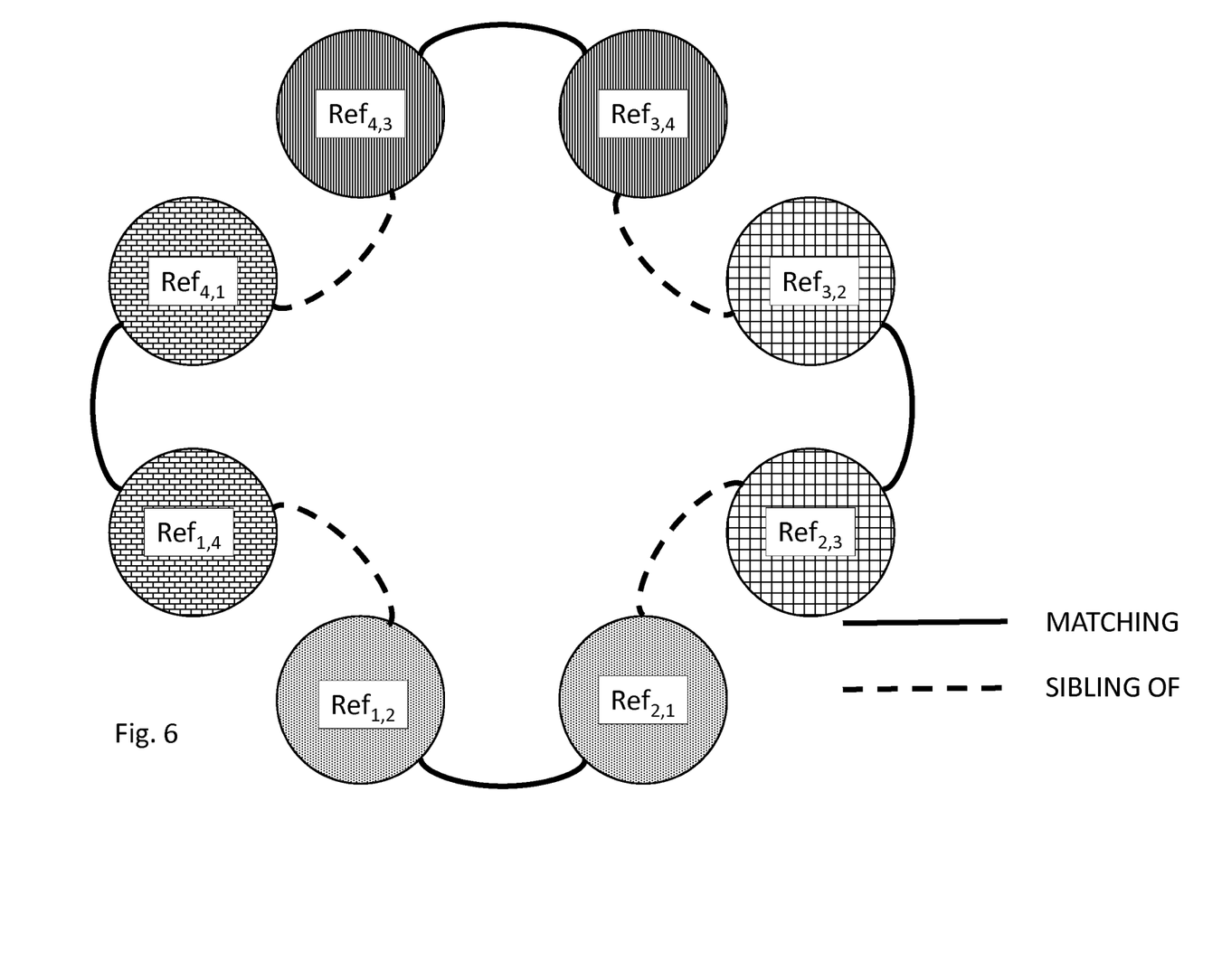

Once the matching areas and the reference areas within them are determined a dependency graph is to be created for these areas. This can be quite straightforward. All reference areas are shown as nodes, and they are connected according to the matching areas and whether they lie in the same texture (denoted as "siblings"). FIG. 6 illustrates such a dependency graph, for the example depicted in FIG. 5.

Once this dependency graph is extracted, individual transformation maps are generated. To this purpose first a local optimization per image is done, and this may be followed by an optimization over the different images from the different cameras.

A first approach for this local optimization starts from individual local optimizations for each of the matching areas. The transformation parameters will thus be generated for the pixels that are in the reference areas. This can be done in the following manner (per matching area—in this case restricted to 2 areas a,b per match, however one can easily extend this to more than 2:

$$\min_{\gamma_{Ref_a}, \gamma_{Ref_b}} \sum_{x \in Ref_a, y \in Ref_b} f(x - T(x, \gamma_{Ref_a}), y - T(y, \gamma_{Ref_b}),$$

$$T(x, \gamma_{Ref_a}) - T(y, \gamma_{Ref_b}))$$

With $\gamma_{Ref\_a}$ and $\gamma_{Ref\_b}$ representing the parameters for the transformation maps at reference areas a and b that need to be found; reference area a being in one image and reference area b being part of another image, With x and y the colors or texture values of the corresponding pixels of respectively reference area a and reference area b, With T(x, y) the transformed texture value x under transformation parameters γ

With $f$ a weighting function that balances the influence between optimizing for good similarity between the transformed and the original color/texture values and the similarity between the transformed matching areas.

The minimization can be done with any off-the-shelf optimizer.

After the local optimizations per matching areas, the complete transformation maps per image are constructed by using a kernel-based interpolation technique (per transformation map). For a certain transformation map, one kernel per reference area is used; e.g. a RBF (Radial Basis Function). For the pixels in between the reference areas, the distance to each reference area is taken as the parameter to the RBF. Interpolation is based on a weighted combination of the different parameters that are associated to each reference area, of which the weights are the outputs of the corresponding RBFs.

This results in locally optimized transformation maps. It is a quick way of building such maps, however this does not necessarily produce the best results. It might for example be better to have a higher error in one of the matched areas when this results in a much lower error in the interpolated areas. Such tradeoffs are not considered in this first method, but can be handled with the next, globally optimized method.

In order to take into account all the images from the other cameras a global optimization is further performed The next equation shows a more globally optimized implementation:

$$\min_\gamma \left( \alpha \sum_{\forall Ref_a, Ref_b \in M: x \in Ref_a, y \in Ref_b} f(x - T(x, \gamma_{Ref_a}), y - T(y, \gamma_{Ref_b}), \right.$$

$$\left. T(x, \gamma_{Ref_a}) - T(y, \gamma_{Ref_b})) + \beta \sum_{x \notin Ref} (x - T(x, \gamma_x)) \right)$$

Notice that the minimization is now not per matching areas, but done over all matching areas (the first part) and non-reference areas (the second part). The tricky part is the value $\gamma_x$ in the second part of the equation. This is the interpolated transformation parameter for a specific pixel x, and depends on the other to-be-optimized parameters $\gamma_{Ref}$. As such, this is a circular dependency which is more difficult to optimize, and typically requires an approximation via an iterative minimization where parts of the equation are fixed while others are optimized. Nonetheless this is certainly possible via off-the-shelf optimizers, but it can take longer to converge compared to the local approach. So depending on the available computational power, one might choose the one or the other implementation.

Figure 7A:
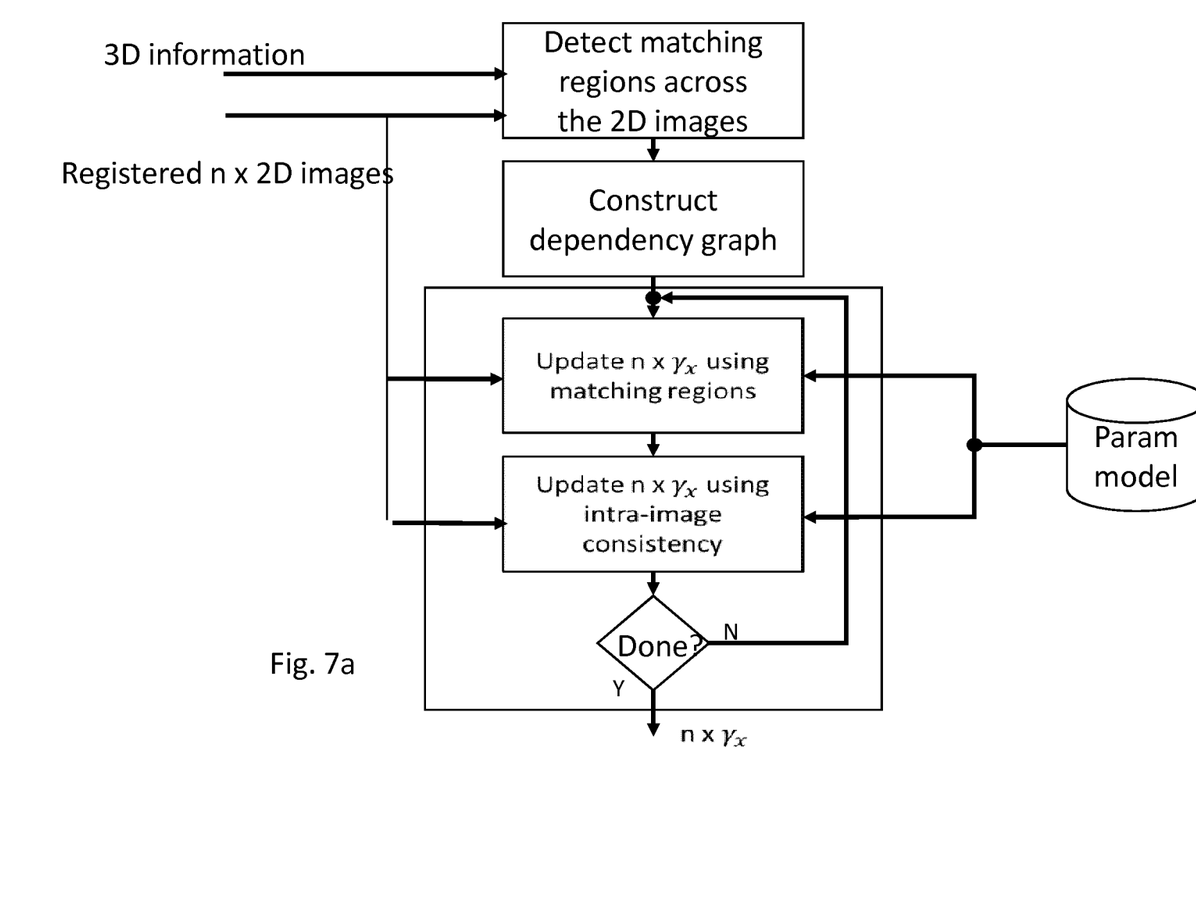
Figure 7B:
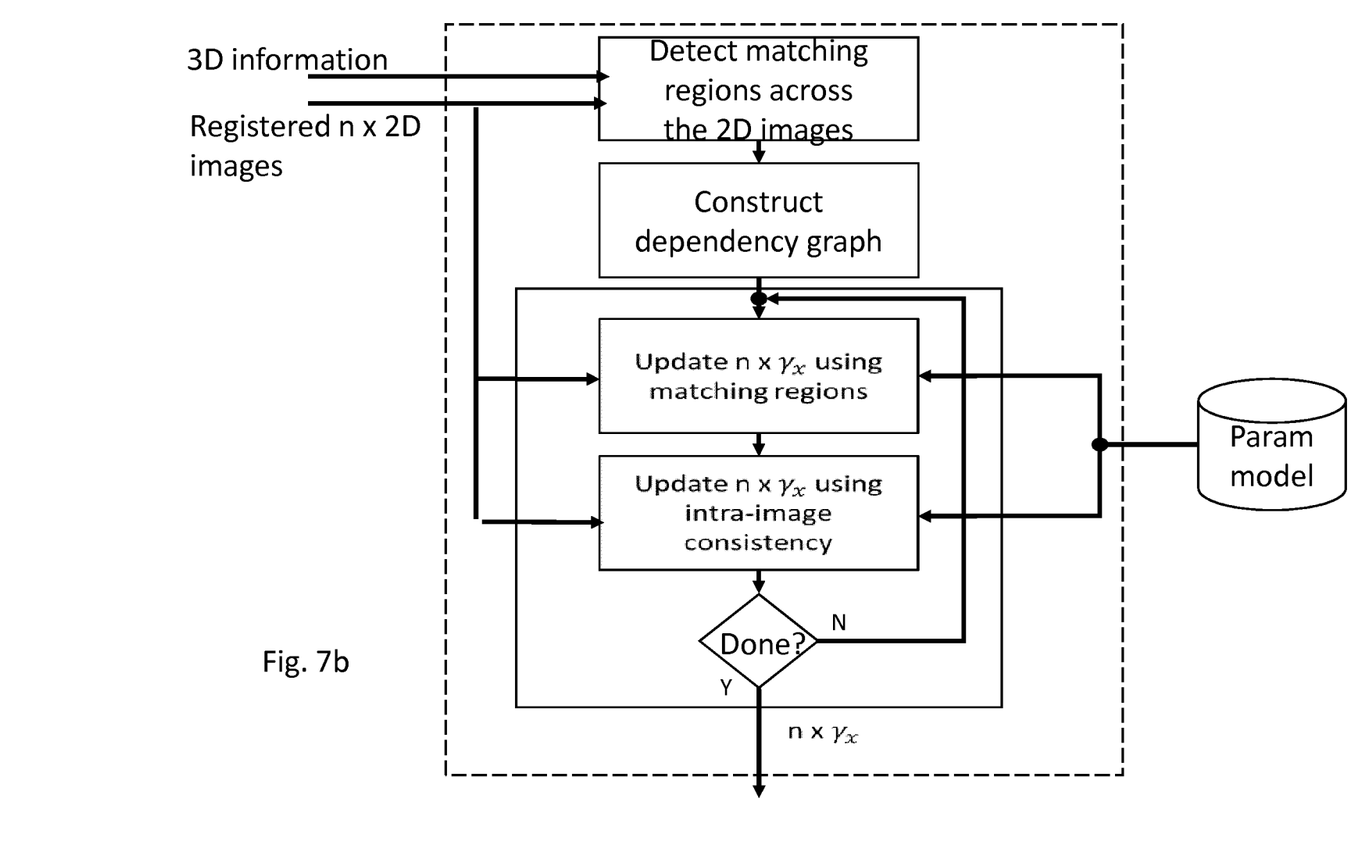

FIG. 7 further illustrates the 2-staged approach where an inter-image optimization is alternated by an intra-image optimization. The first stage consists of matching the regions in order to find $\gamma_{Ref}$ for each reference region. This can be done using any off-the-shelf optimizer as mentioned in the previous section. Note that the parameter model is used to impose restrictions on the optimization such as valid parameter ranges, allowed derivates with respect to the local neighborhood, etc. Instead of taking this result as an absolute, we will infer the result onto a current estimate for the transformation map $\gamma_I$ for each of the images. This inference can be done using a simple linear blend between the current parameters in $\gamma_I$ and the new parameters in $\gamma_{Ref}$ (where defined; i.e. only for the reference regions). For example, assuming {x,y} is valid for both $\gamma_I$ and $\gamma_{Ref}$ (that pixel location is part of the image and of the reference area), one can provide an update for $\gamma_I$ by stating $\gamma_I'(x,y)=(1-\alpha)\gamma_I(x,y)+\gamma_{Ref}(x,y)$. α can be used to influence how strong the influence of the first stage needs to be. Note that, for the first iteration, α can be set to 1.

The second stage will update the transformation map in order to make it (more) consistent with the parameter model within each of the 2D images. So where stage 1 changes the transformation maps in order to optimize with regards to the matching regions in different images, stage 2 changes the transformation maps in order to optimize within each of the images. One could say stage 1 does inter-image optimizations while stage 2 does intra-image optimizations.

Stage 2 will use the parameter model in order to update each of the transformation maps $\gamma_I$. As mentioned before, the parameter model specifies things like the valid parameter ranges, allowed derivates with respect to the neighborhood, etc and can also include rules regarding valid combinations of parameters. Using these factors, the transformation maps $\gamma_I$ will be updated. As practical example, one of the rules might impose a maximum for the derivate of a certain parameter with respect to its neighbors. When it is detected that transformation map $\gamma_I$ does not comply with this rule at location $\{x,y\}$, one could apply a 2D Gaussian filter on the neighborhood of this location in order to smooth the parameter out in that neighborhood.

These stages are generally iterated until a certain stop condition is achieved. This is typically done by imposing a maximum number of iterations, e.g. 20, depending on the complexity of the model, and/or a quality metric that takes into account the current error wrt. the matching areas and the intra-image consistency with the parameter model.

As an extension, one can also add a weight map to each of the textures in order to deal with additional prior knowledge.

This weight map would influence how important the source color information for a certain pixel is in the optimization process. This can be useful when one could detect, for example, glare in a texture. One can then choose to reduce the weight of the relevant pixels (because their color value has noise due to the glare artifact) so the "error" compared to the source color is less important. As such, the transformation map will be more biased to the matching areas that do have reliable source color values.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

While the principles of the invention have been described above in connection with specific apparatus, it is to be clearly understood that this description is made only by way of example and not as a limitation on the scope of the invention, as defined in the appended claims.

The invention claimed is:

1. A method for generating a set of respective transformation maps for a set of respective two-dimensional (2D) images from a same object and using a parameter-based transformation model, said method comprising
   receiving said set of respective 2D images and said parameter-based transformation model
   detecting matching regions across several pairs of the 2D images, based on the set of 2D images and three-dimensional (3D) information of said object,
   identifying respective interdependencies of the matching regions over the 2D images,
   optimizing the parameters of the parameter-based transformation model over the matching regions of the images as well as over the non-matching regions in the images.

2. The method according to claim 1, further comprising a calibrating the set of respective 2D images and the 3D information of said object.

3. The method according to claim 1, whereby said optimizing comprises solving an optimization function over said respective matching regions, and over the non-matching regions of the images.

4. The method according to claim 1, whereby said optimizing comprises an iterative process of updating the parameters of the model over the respective matching regions of the images followed by updating the parameters of the model in between the matching regions in the respective images.

5. The method according to claim 4, wherein said iterative process is ended based upon a predetermined maximum number of iterations.

6. The method according to claim 4, wherein said iterative process is ended based upon a quality metric.

7. An image processing device for generating a set of respective transformation maps for a set of respective two-dimensional (2D) images from a same object and using a parameter-based transformation model, said image processing device comprising:
   at least one processor; and
   at least one memory including computer program code;
   the at least one memory and the computer program code configured to, with the at least one processor, cause the image processing device at least to perform:
      receiving said set of respective 2D images and said parameter-based transformation model
      detecting matching regions across several pairs of the 2D images, based on the set of 2D images and three-dimensional (3D) information of said object,
      identifying respective interdependencies of the matching regions over the 2D images,
      optimizing the parameters of the parameter-based transformation model over the matching regions of the images as well as over the non-matching regions in the images,
      providing the optimized parameters of the transformation model for the pixels of the images on an output of said image processing device.

8. The image processing device according to claim 7, wherein the at least one memory and the computer program code are configured to, with the at least one processor, cause the image processing device at least to perform calibrating the set of respective 2D images and the 3D information of said object.

9. The image processing device according to claim 7, wherein the at least one memory and the computer program code are configured to, with the at least one processor, cause the image processing device at least to perform solving an optimization function over said respective matching regions, and over the non-matching regions of the images.

10. The image processing device according to claim 7, wherein the at least one memory and the computer program code are configured to, with the at least one processor, cause the image processing device at least to perform calculating said parameters in an iterative way comprising updating the parameters of the model over the respective matching regions of the images followed by updating the parameters of the model in between the matching regions in the respective images.

11. The image processing device according to claim 10, wherein said iterative process is ended based upon a predetermined maximum number of iterations.

12. The image processing device according to claim 10, wherein said iterative process is ended based upon a quality metric.

13. A non-transitory computer readable medium comprising program instructions for causing an apparatus to perform at least the following:
    receiving said set of respective 2D images and said parameter-based transformation model
    detecting matching regions across several pairs of the 2D images, based on the set of 2D images and three-dimensional (3D) information of said object,
    identifying respective interdependencies of the matching regions over the 2D images,
    optimizing the parameters of the parameter-based transformation model over the matching regions of the images as well as over the non-matching regions in the images.

* * * * *